April 3, 1928.  1,665,002
O. VON GRUBER
DEVICE FOR TRACING CROSS SECTIONS
Filed Sept. 16, 1927
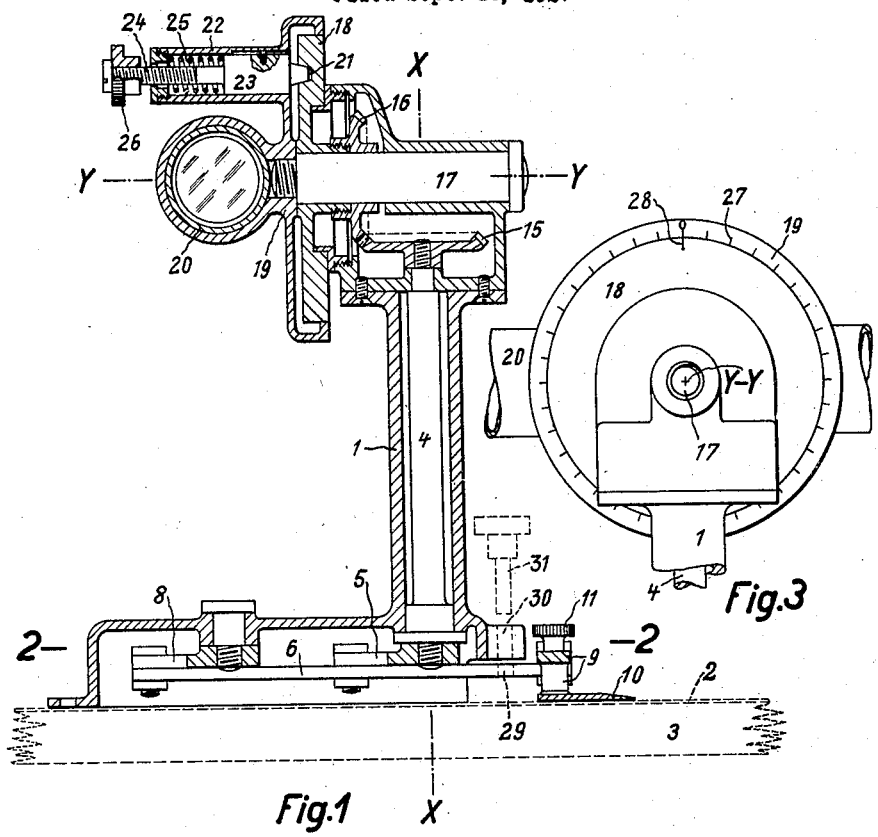
Fig.1
Fig.3
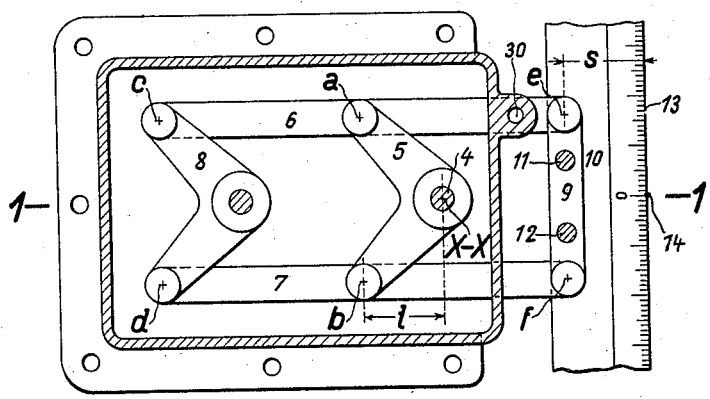
Fig.2
Inventor:
Otto v. Gruber Patented Apr. 3, 1928.

1,665,002

UNITED STATES PATENT OFFICE.

OTTO von GRUBER, OF STUTTGART, GERMANY, ASSIGNOR TO THE FIRM CARL ZEISS, OF JENA, GERMANY.

DEVICE FOR TRACING CROSS SECTIONS.

Application filed September 16, 1927, Serial No. 220,028, and in Germany September 30, 1926.

There are already well known devices for tracing cross sections by means of a ruler, which is rotatable about a vertical axis and so coupled to a telescope, rotatable about a horizontal axis and provided with a rangefinding device, that a rotation of the telescope about its horizontal axis of rotation entails a uniform rotation of the ruler about its vertical axis of rotation.

In order to be able to also use such a device as a telescopic graphometer, according to the invention provision is made for a device by means of which the coupling between the ruler and the telescope is suspended and the ruler may be fixed relatively to the horizontal axis of the telescope. In order to afford at any time an undisturbed observation of the ruler it is advisable to dispose the vertical axis of rotation of the ruler outside the foot of the device, which may be easily attained by means of a parallelogram-device by which the rotations of a vertical shaft, supported within the foot of the device and coupled to the telescope, are transmitted to the ruler.

The annexed drawing shows as a constructional example a device according to the present invention. Fig. 1 is a sectional elevation, Fig. 2 a sectional plan and Fig. 3 a partial side-view.

In a casing 1, which is destined to be located on the drawing sheet 2 of a measuring table, a shaft 4 is rotatably supported in such a way that its axis of rotation X—X is perpendicular to the measuring table 3. The shaft 4 is screwed to a bell-crank lever 5, which is connected by means of two links 6 and 7 to a like bell-crank lever 8, rotatably supported on the casing 1, whereby the arrangement is such that the points of application $a$ and $b$ of the bell-crank lever 5 on the links and the points of application $c$ and $d$ of the bell-crank lever 8 on the links form together a parallelogram. Furthermore, an intermediate piece 9 is hingedly connected to the links 6 and 7 in such a way that the connecting line of its points of application $e$ and $f$ is parallel to the corresponding connecting lines $a\,b$ and $c\,d$. On this intermediate piece is fixed a ruler 10 by means of two screws 11 and 12 in such a way that its edge 13 is parallel to the connecting line $e\,f$ and has from it a distance $s$, which is equal to the distance $t$ of the axis X—X from the connecting line $a\,b$. Thereby one attains that in the case of rotations of the shaft 4 about its axis of rotation X—X the ruler 10 always rotates through the same angle as the shaft 4 about an axis parallel to this shaft, which contains a point 14 of the edge of the ruler 13 in which the zero point of the scale of the ruler has to lie.

The shaft 4 engages by means of a bevel wheel 15 in a bevel wheel 16, which is disposed easily rotatable on a shaft 17, supported within the casing 1 in such a way that its axis Y—Y perpendicularly intersects the axis X—X of the shaft 4. Both bevel wheels have the same number of teeth. The bevel wheel 16 is screwed to a disc 18, while the shaft 17 is screwed to an annular body 19, constructed as a carrier of a telescope 20, which is assumed to be provided in a known way with a range-finding device and so disposed within the annular body 19 that its sighting line perpendicularly intersects the axis Y—Y. The disc 18 contains a conical proof-hole 21. In an extension tube 22 of the annular body 19 is displaceably supported at bolt 23, which is at its one end so constructed as to fit into this hole and which carries at its other end a thread 24. A spring 25 tends to continuously press the bolt 23 against the disc 18, while a nut 26, engaging in the thread 24, admits of withdrawing the bolt 23 from the disc against the spring action. The arrangement is such that the bolt 23 then lies exactly opposite the hole 21 if at the same time the sighting line of the telescope 20 and the edge of the ruler 13 are perpendicular to the plane, determined by the axes X—X and Y—Y. If this be the case, the angular value 0° is indicated on a scale 27 of the annular body 19 by an index 28 of the disc 18. If the edge of the ruler 13 be in the said position in which it is perpendicular to the plane, determined by the axes X—X and Y—Y, a hole 29 of the link 6 is exactly opposite a hole 30 of the casing 1 and the ruler 10 can be fixed relatively to the casing 1 by means of a bolt 31 (shown in the drawing by dotted lines).

Before using the device the measuring table is to be adjusted so as to be horizontal. If the device is to be used as a telescopic graphometer, the ruler 10 must be brought into that position in which the hole 30 of the casing 1 is opposite the hole 29 of the link 6 and thereupon the ruler must be fixed relatively to the casing 1 by introducing the bolt 31 into the two holes. If the bolt 23 be drawn off from the disc 18, so that the annular body 19 may freely move relatively to the disc 18, the device represents a telescopic graphometer. If, however, the disc 18, by introducing the bolt 23 into the proof-hole 21, be coupled to the annular body 19 and the bolt 31 removed from the holes 29 and 30, the device is adjusted for tracing cross sections.

I claim:

1. Device for tracing cross sections containing a foot, a ruler supported on this foot rotatable about a vertical axis, a telescope adapted to measure distances and supported on the foot rotatable about a horizontal axis, a coupling inserted between the telescope and the ruler, adapted to impart to the ruler during rotations of the telescope about the said horizontal axis a uniform rotation about the said vertical axis, the said coupling being disengaging, and means adapted to fix the ruler with respect to the said foot.

2. Device for tracing cross sections containing a foot, a ruler supported on this foot rotatable about a vertical axis lying outside the foot, a telescope adapted to measure distances and supported on the foot rotatable about a horizontal axis, a vertical shaft rotatably supported in the foot, a coupling inserted between the telescope and the said shaft, adapted to impart to the shaft during rotations of the telescope about the said horizontal axis a uniform rotation about its axis, the said coupling being disengaging, and a parallelogram-device inserted between the said shaft and the ruler, adapted to impart to the ruler during rotations of the shaft about its axis a uniform rotation about its axis of rotation, and means adapted to fix the ruler with respect to the said foot.

OTTO v. GRUBER.